Patented Jan. 24, 1933

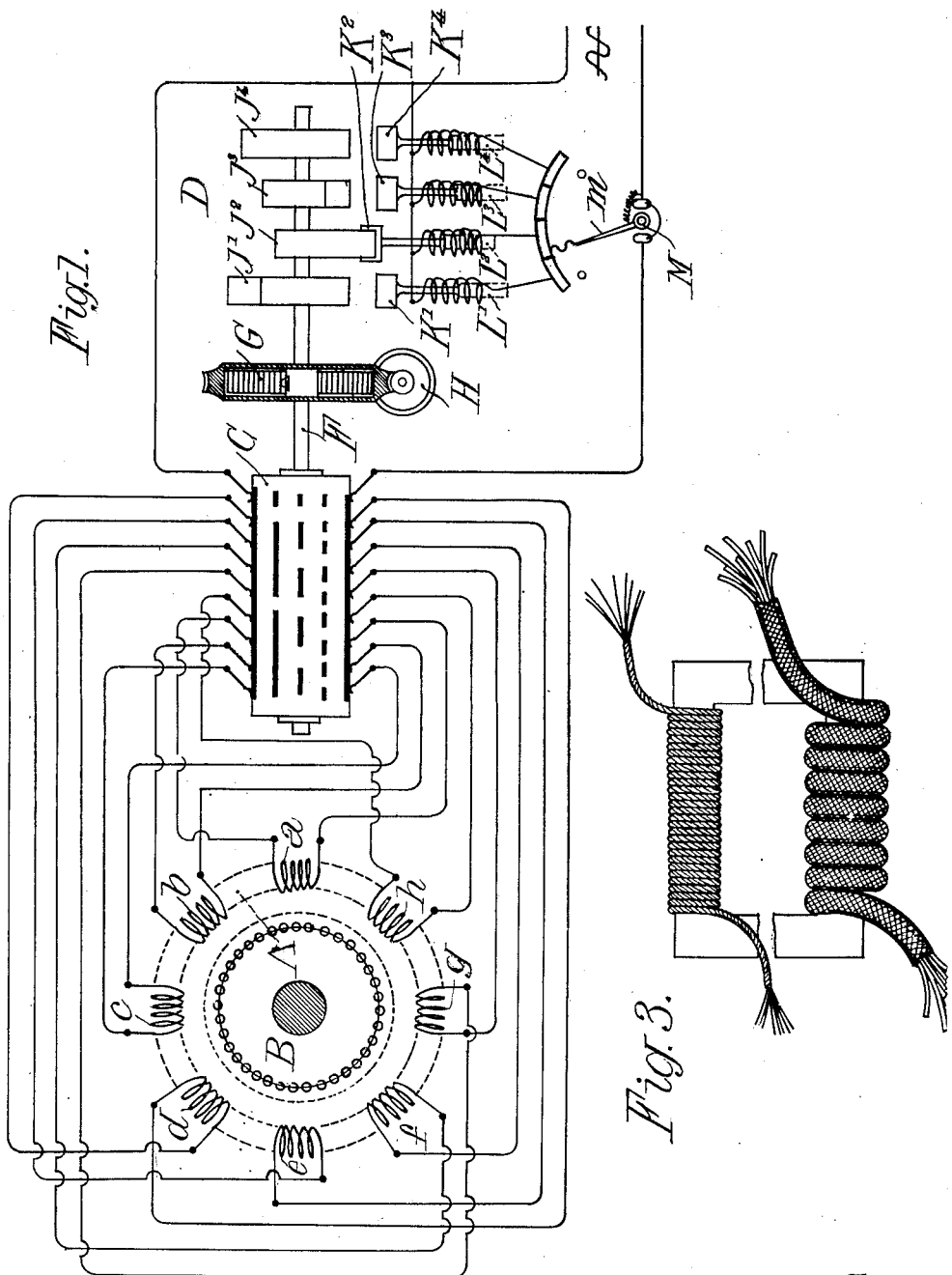

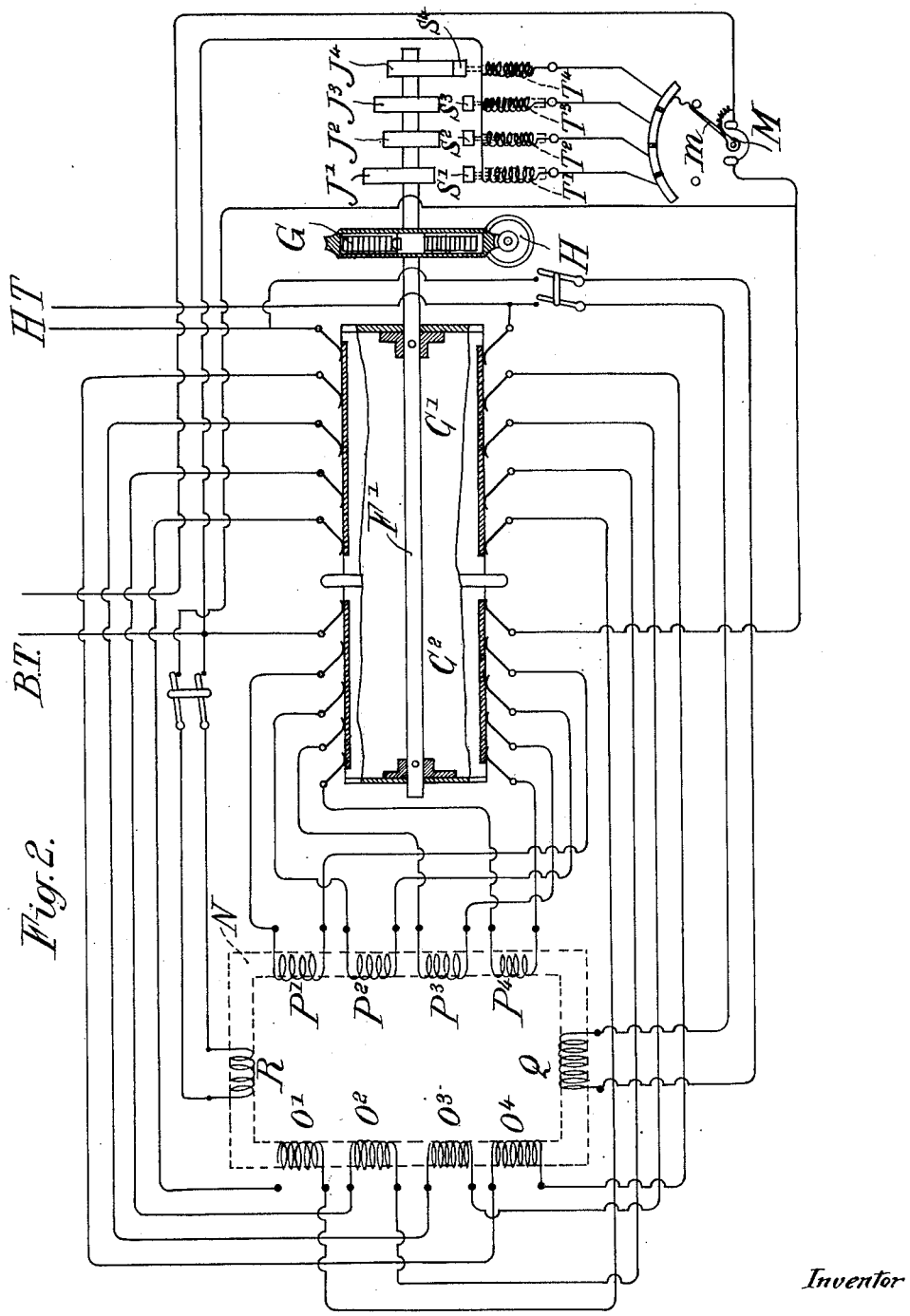

1,895,096

UNITED STATES PATENT OFFICE

MICHEL DOLOUKHANOFF, OF VERSAILLES, FRANCE

ELECTRICAL MACHINE

Application filed January 4, 1927, Serial No. 158,975, and in Belgium January 4, 1926.

This invention relates to methods and apparatus for varying the flux through the magnetic circuits of electrical machines.

One of the objects of the invention is to provide means for varying the magnetic flux by changing the coupling of the inducing circuits i. e. of the magnetic coils.

Another object is to make the flux variations automatically responsive to the type of load.

A further object is to connect the various elements of a single machine or of several machines having a common magnetic circuit with a combining mechanism so as to yield all possible combinations in the primary or secondary circuits and so that the combinations in the primary or inducing circuits be not necessarily identical with those in the secondary or induced circuit.

Additional objects will appear in the course of the detailed description which will now be given to the accompanying drawings in which:

Fig. 1 represents, diagrammatically, an induction motor constructed in accordance with the invention.

Fig. 2 is a diagram of a static transformer embodying the inventive idea herein described.

Fig. 3 is a diagram of a novel mode of winding a static transformer.

Referring to Fig. 1 of the drawings, there is shown an induction motor made up of a stator A and a rotor B. Stator A is shown, for illustrative purposes, as bipolar, rotor B as of the squirrel cage type, and the feed circuit as being monophase. In order to simplify the drawing and description, the starting coils generally necessary with motors operating on monophase current are not shown, it being understood it is only necessary to pass an alternating current through the main inductor and a current more or less out of phase through the starting coils to obtain the necessary starting impulse.

Stator A, instead of being formed of a single coil, usually bipolar, is made up of a series of coils $a, b, c, d, e, f, g, h, \ldots$ capable of being thrown into or out of action separately or in groups, and being further arranged so as to be combinable in series, in parallel or in parallel series, but always so as to maintain the number of poles constant. The terminals of coils $a$ to $h$ are arranged on a distributing and combining mechanism C so that, for successive positions of the latter, the various coils are introduced into or cut out of the circuit or combined in the various ways indicated above. Distributor C is controlled by mechanism D, which is arranged preferably to be quick starting. Motive power may be furnished to D by a spring held under strain by a small motor as described in Belgian Patent No. 319,396 of July 7, 1924.

The successive movements of distributor C may be controlled by an apparatus having a movable element whose displacements are proportional to or a function of the load, the current, the voltage, the velocity of rotation, the power developed, the power demanded, or of any other factor which it is desired to link with the change of flux. Movement of C with the change in any one of the variables enumerated may be obtained by coupling it to a shaft F under the influence of spring G (which latter is maintained under constant tension by motor H), said shaft having a series of cams $J^1, J^2, J^3, J^4, \ldots$ mounted thereon which contact successively with contacts or stops $K^1, K^2, K^3, K^4, \ldots$ magnetized by solenoids $L^1, L^2, L^3, L^4, \ldots$ Solenoids $L^1, L^2$, etc. are magnetized by a current controlled directly by the position of movable member $m$ of apparatus M or by a series of relays actuated by said movable member. Apparatus M may be an ammeter, a voltmeter, a speed counter, a tachometer, a wattmeter or a dynamometer in accordance with the particular variable chosen to control the flux.

With an apparatus as above described, it is evident that for any chosen value of the controlling factor or factors (voltage, amperage etc.) the coils may be made to assume a position in series with one another and with the feed terminals, that for a second chosen value they may be shifted into parallel with the feed line, for a third value in parallel series, and for other values some of the coils may be cut out of the circuit completely while others are grouped in series, or in parallel series, or in parallel with one another and with the transmission terminals as desired. It is evident, from the foregoing, that the number of circuits may be increased indefinitely and that the number of poles remain constant irrespective of particular grouping of coils.

Fig. 2 illustrates the invention as applied to a static transformer wherein it is desired to automatically adjust the operating characteristics to instantaneous changes in the load. Here, core N, instead of being wound with one high tension and one low tension coil, is wound with a series of high tension coils $O^1$, $O^2$, $O^3$, $O^4$, . . . and with a corresponding number of low tension coils $P^1$, $P^2$, $P^3$, $P^4$, . . . The ends of the various coils of the O series are connected to the brushes of high tension distributor $C^1$ and those of the P series to the brushes of low tension distributor $C^2$. Distributors $C^1$ and $C^2$ are rigidly keyed to shaft $F^1$, similar to shaft F of Fig. 1, which shaft is actuated by spring G and motor H and carries cams $J^1$, $J^2$, $J^3$, $J^4$, . . . arranged to successively contact with contacts or stops $S^1$, $S^2$, $S^3$, $S^4$, . . . actuated by solenoids $T^1$, $T^2$, $T^3$, $T^4$, . . . From the foregoing, it is evident that the position of the drum distributors $C^1$, $C^2$, depends entirely on the particular contact S actuated by a given solenoid T. The contact elements on the periphery of $C^1$, $C^2$ are distributed so that the coils of the O and P series are simultaneously and synchronously connected to or disconnected from the circuit and coupled in series, in parallel, in parallel series etc. Drum $C^1$, $C^2$ serves then as a means for obtaining all possible combinations of both the high and low tension coils. The number of cams J correspond to the number of positions which the drum $C^1$, $C^2$ may assume. Magnetization of any solenoid T will therefore instantaneously bring the distributing drum to the corresponding setting. Solenoids T are linked to instrument M in the manner described in connection with solenoids L represented in Fig. 1. From the foregoing, it will be seen, that the manner in which the coils are coupled and, therefore, the operating characteristics of the transformer may be made to vary with any factor determining the character of the magnitude of the load.

Distributors $C^1$, $C^2$ may be arranged to have a "zero" position corresponding to the zero position of instrument M and of the corresponding solenoid $T'$, contact $S'$ and cam $J'$.

It is to be understood that the transformer need not be constructed necessarily as described, but may be distributed symmetrically (Fig. 3) in such a manner that each coil will be homologous to or identical with the one corresponding thereto. This may be accomplished for example, by arranging the coils so as to form separate insulated strands in a single cable.

The invention is not to be considered as limited to the particular illustrative embodiments hereinbefore described but includes all variants of the inventive idea defined in the appended claims.

What I claim is:—

1. An apparatus of the class described comprising in combination a first group of coils, a rotatable distributing and combining mechanism including means for changing connections between the individual coils composing said first group, leads connecting each coil to the distributing and combining mechanism, a transmission line in circuit with said mechanism, a cam shaft connected to the rotatable portion of said mechanism, a motor connected to said cam shaft, a meter connected to the transmission line, stopping elements arranged opposite each cam of the cam shaft, and means connected to the meter for actuating each one of the stopping elements.

2. An apparatus of the class described comprising in combination a first group of coils, a second group of coils in inductive relation to said first group, a distributing and combining mechanism including means for changing connections between individual coils within either group of coils, leads leading from each coil of each group of coils to the distributing and combining mechanism, a transmission line in circuit with said distributing and combining mechanism, a cam shaft connected to the distributing and combining mechanism, a meter connected to the transmission line, a motor connected to the cam shaft, and means actuated by the meter for stopping the cam shaft in various positions.

3. In a dynamo-electrical machine, a rotor winding, a stator winding including a plurality of coils connected operatively together, a circuit connected to said motor, and means operative by variations in the electrical characteristics of the load in said circuit to vary the connections between the stator coils, said coils being capable of being grouped in parallel, in series or in parallel series.

4. In a dynamo-electric machine, a rotor winding, a stator winding including a group of coils adapted to be interconnected in various ways, a rotatable distributing and combining mechanism in conductive relation with said coils and operative to vary the connections between coils when rotated to occupy any one of a plurality of angular positions, a transmission line, and means operative by variations in the electrical characteristics of the load in the transmission line to vary the angular position of the distributing and combining mechanism.

5. In combination, a first group of coils adapted to be interconnected in various ways, means for interconnecting said coils in various ways so that the total number of interconnected coils remains constant, said coils being capable of being grouped in parallel, in series, or in parallel series, a second group of coils in inductive relation to said first group, a transmission line connected to one of said groups of coils, and means operative by changes in the electrical characteristics of the load in the transmission line to actuate said first-named means.

6. In a dynamo-electric machine, a first group of coils adapted to be interconnected in parallel and series relation, a second group of coils in inductive relation to said first group, said first and second groups of coils being rotatable relatively to one another, a transmission line connected to one of said groups of coils, and means operative by variations in the electrical characteristics of the load in the transmission line to vary the interconnections of said first group of coils.

In testimony whereof I have hereunto set my hand.

MICHEL DOLOUKHANOFF.